United States Patent [19]

Takahashi et al.

[11] 4,378,109
[45] Mar. 29, 1983

[54] DEVICE FOR DETECTING THE THICKNESS OF A PAPER SHEET

[75] Inventors: Hisashi Takahashi; Toshiyuki Miyano, both of Yokohama, Japan

[73] Assignee: Tokyo Shibaura Denki Kabushiki Kaisha, Kawasaki, Japan

[21] Appl. No.: 186,621

[22] Filed: Sep. 12, 1980

[30] Foreign Application Priority Data

Sep. 19, 1979 [JP] Japan .............................. 54-128656[U]
Sep. 19, 1979 [JP] Japan .............................. 54-128657[U]

[51] Int. Cl.³ .............................................. B65H 7/12
[52] U.S. Cl. ..................................... 271/263; 209/603; 209/604
[58] Field of Search ................ 271/262, 263; 209/603, 209/604

[56] References Cited

U.S. PATENT DOCUMENTS 4,127,266 11/1978 Williams .............................. 271/263
4,132,402 1/1979 Morrison .............................. 271/263

Primary Examiner—Richard A. Schacher
Attorney, Agent, or Firm—Cushman, Darby & Cushman

[57] ABSTRACT

A device for detecting the thickness of paper sheet such as bank note used for a paper sheet transfer system comprises a thickness detection roll rotatably supported at a free end of a pivotal lever and urged against a paper sheet transfer roll, via a paper sheet when the paper sheet is transferred therebetwen. The pivotal lever is pivotally supported by a lever mounting unit, which is detachably mounted on a frame of the transfer system. The lever mounting unit is positioned in a predetermined mounting position by positioning pins and locked at that position by a fixing means including a toggle mechanism. With a change of the thickness of paper sheet being transferred the gap between an electromagnetic sensor mounted in the frame and a corresponding sensing surface of the lever is changed, and thereby the paper sheet thickness is electromagnetically detected.

11 Claims, 11 Drawing Figures

DEVICE FOR DETECTING THE THICKNESS OF A PAPER SHEET

This invention relates to a device for detecting the thickness of a paper sheet and used for a paper sheet transfer system, which transfers the paper sheet such as bank note, security sheet and check sheet and comprises a rotary transfer roll and a plurality of band-like belt pairs passed round the transfer roll and spaced apart crosswise or laterally with respect to the direction of transfer of the paper sheets, each thereof being transferred past the transfer roll in a state sandwiched between the upper and lower belts.

The paper sheet thickness detection device of this kind is installed in, for instance, a cash dispenser and serves to detect two or more bank notes being transferred in an overlapped state toward a bank note outlet and thereupon delivers an overlap detection signal to a paper sheet transfer stop mechanism for stopping the machine.

In the past, the detection of the paper sheet thickness in the above kind of thickness detection devices has been based upon various principles, for instance an optical method, a method using a piezoelectric element and detecting a pressure change and a method having resort to an electromagnetic sensor.

As the prior-art thickness detection device, to which the invention appertains, there is one as schematically shown in FIGS. 1A and 1B. Also, Japanese Utility Model Disclosure No. 24251/76, disclosed on Feb. 23, 1976, shows a device of the same type.

In the prior-art thickness detection device shown in FIGS. 1A and 1B, paper sheet (p) such as bank notes is transferred round an upper peripheral portion of a transfer roll (a) in a state sandwiched between upper and lower transfer belts (b) provided as a plurality of pairs. The lower belts are guided in respective guide grooves (c) formed in the outer periphery of the transfer roll (a) as they proceed thereround. A thickness detection roll (d) is urged against the transfer roll (a), via a paper sheet (p) when the paper sheet comes between the two. As is shown in FIG. 1B, the detection roll (d) is urged against a portion of the transfer roll (a) other than the guide grooves (c). The detection roll (d) is rotatably mounted in a free end portion of a leaf spring plate (f), which is secured at its base end to a frame (e) and extends substantially horizontally. Above the free end portion of the plate (f) an electromagnetic sensor (h) is disposed to define a magnetic gap (g) between its lower end surface and a sensing surface (i), which is the upper surface of the free end of the plate (f).

The detection roll (d) is vertically displaced with a change of the thickness of the paper material being transferred underneath it, and as a result the gap (g) is changed. This change of the gap (g) is magnetically sensed by the sensor (h), which then delivers a detection signal to an other system.

The above prior-art construction, however, has the following problem. Since the detection roll (d) is always rotated in contact with the paper sheet surface during the detecting operation, dust is transferred from the paper sheets to and accumulates on the peripheral surface of the detection roll (d). If the machine is continually used without cleaning the dust attached to the detection roll (d), the accuracy of detection is reduced, so that it is necessary to periodically clean the detection roll and the peripheral parts of the machine. Particularly where the paper sheets are bank notes considerably including old ones, the dust accumulation is considerable, so that the detection roll has to be cleaned considerably frequently. However, with the construction shown in FIG. 1A, in which the space between the transfer roll (a) and sensor (h) is very narrow, it is very difficult to make access to the detection roll (d) for cleaning the same.

More particularly, this difficulty arises from the facts that the plate (f) supporting the detection roll (d) is permanently fixed to the frame (e) so that at the time of the cleaning the detection roll can be moved away from the transfer roll to a limited extent corresponding to the magnetic gap (g), which is very narrow. In addition, the illustrated prior-art device, in which an increase of the thickness of paper material is detected as a corresponding reduction of the magnetic gap (g) which is very narrow as mentioned, further poses the following problem.

In such a case as when a number of paper sheets are faultly transferred in an overlapped state past the detection roll (d), it is likely that the detection roll is excessively raised and, in an extreme case, the sensing surface (i) of the plate (f) may strike the sensor (h) to cause damage thereto. The possibility of causing damage to the sensor (h) is also prone in case when the detection roll encounters and rides on an object attached to a paper sheet being transferred.

The primary object of the invention is to provide a paper sheet thickness detection device, with which the cleaning of the detection roll and peripheral parts can be readily and sufficiently made so that high accuracy of the paper sheet thickness detection may always be obtained.

To achieve the above object of the invention, in the device according to the invention the detection roll is mounted in a pivotal lever supported by a lever mounting unit which is detachably mounted on a frame. The lever mounting unit is positioned in a predetermined mounting position by appropriate positioning means, for instance pins projecting from the frame and engagement holes formed in the unit and engaging the respective pins. The frame is provided with a locking or fixing means, for instance a toggle mechanism, and the lever mounting unit is detachably or releasably locked in the aforementioned mounting position by that means.

With the detection device of the above construction according to the invention, for cleaning the detection roll the lever mounting unit is released by manually operating the locking means, and the unit is then taken away from the frame. By so doing, the pivotal lever and detection roll are removed together with the unit. Thus, it is not necessary to make access to the narrow space between the sensor and transfer roll for cleaning the detection roll. After the cleaning is ended, the detection roll can be brought again to its regular position by mounting the lever mounting unit on the frame again. The positioning means and fixing means assures the same dimensional precision after the unit is mounted again.

The aforementioned toggle link mechanism employed for the fixing means permits the lever mounting unit to be simply locked and released by merely vertically operating a handle, that is, by a highly ready and quick single action.

An other specific construction according to the invention features that the gap between the sensing surface of the lever and the sensor is increased with the displacement of the detection roll caused by an increase of the detected paper sheet thickness. Thus, the sensing surface will never strike the sensor in this case even if the detection roll is excessively displaced, and the lever can be turned for a considerably large angle.

In a further feature of the invention, a cushioning member is provided such that it is always in contact with the lever. When the detection roll rolls over a paper sheet, the lever tends to be subject to very slight vibrations, which are undesired from the standpoint of the accurate thickness detection. The cushioning member has the effect of quickly damping the vibrations and thus permits more accurate thickness detection to be obtained.

The above and other objects, features and advantages of the invention will become more apparent from the description of the preferred embodiments of the invention when the same is read with reference to the accompanying drawings.

Figure 1A:
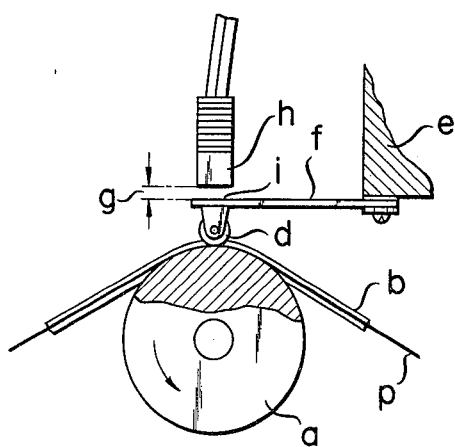
FIG. 1A is a schematic elevational view, partly broken away, showing a prior-art paper sheet detection device.
Figure 1B:
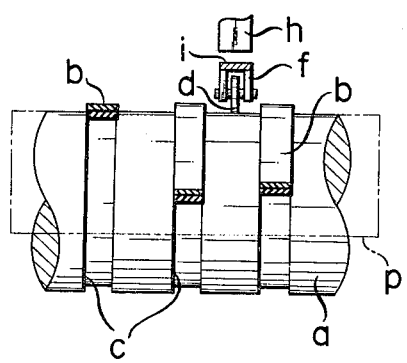
FIG. 1B is a left side view of the device of FIG. 1A.
Figure 2:
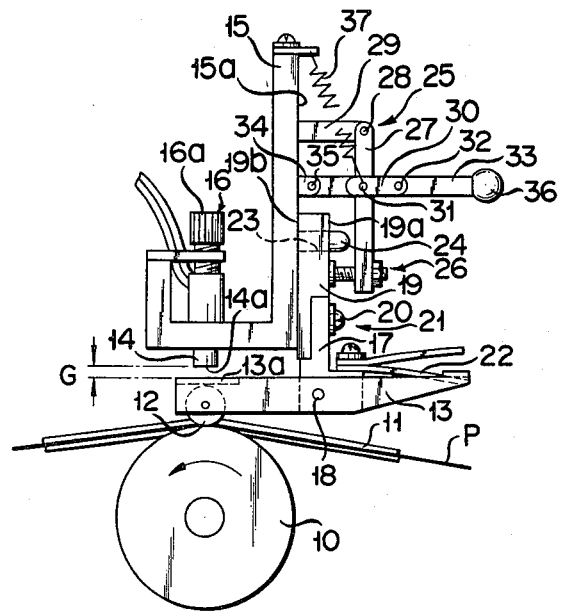
FIG. 2 is an elevational view showing a first embodiment of the paper sheet detection device according to the invention.
Figure 3:
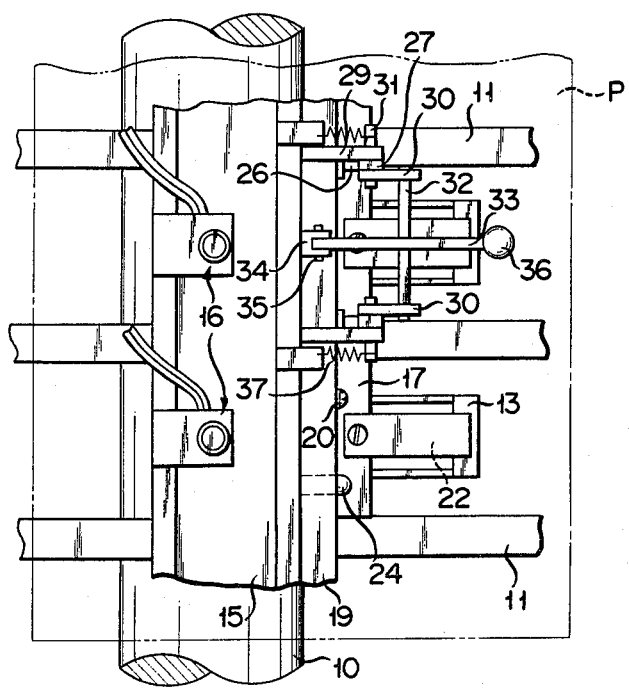
FIG. 3 is a fragmentary top view of the device of FIG. 2 with a broken line showing of a paper sheet being transferred.

Referring now to FIGS. 2 and 3, designated at 10 is a transfer roll rotating in the direction of arrow, and at 11 a plurality of laterally spaced-apart transfer belt pairs proceeding round the transfer roll 10 for transferring thereround paper sheets P such as bank notes which are each sandwiched between the upper and lower belts of the individual pairs. The transfer roll 10 and paper sheet transfer belt pairs 11 are of the same construction as those shown in FIGS. 1A and 1B.

A detection roll 12 of a small diameter, which is urged against the top of the transfer roll, via a paper sheet when the paper sheet comes under it, is rotatably mounted in a substantially horizontal lever 13 made of a metal at one free end thereof. The present device actually comprises a plurality of detection rolls 12, levers 13 and associated members. For briefness of description, however, reference is only made to one set of rolls 12, levers 13 and associated members. The top surface of a free end portion of the lever 13 on the side of the detection roll 12 constitutes a sensing surface 13a. This surface 13a is formed by, for instance, bending an upper side extension of the lever 13 as shown by a broken line in FIG. 2.

An electromagnetic sensor 14 is supported by a frame 15 of the paper sheet transfer system. Its lower end surface 14a is aligned to the sensing surface 13a in a vertical line, and a variable electromagnetic gap G is defined between the surfaces 13a and 14a. As is seen from FIG. 2, the center of the transfer roll 10, the center of the detection roll 12, the sensing surface 13a and the sensor 14 are aligned in a vertical line (i.e., lie on the vertical line).

The sensor 14 is coupled to a fine adjustment screw mechanism 16, and a fine adjustment of the position of the sensor 14, i.e., the vertical position thereof, with respect to the frame 15 can be made by turning a knob 16a of the screw mechanism 16.

The lever 13, which extends in the direction of transfer of the paper sheet P, is pivoted at its central portion by a pin 18 to a first bracket 17. The bracket 17 extends laterally with respect to the direction of transfer of the paper sheet as shown in FIG. 3, and has an L-shaped sectional profile. The first bracket 17 is secured by a plurality of screws 20 to a second bracket 19. The second bracket 19 also extends laterally with respect to the transfer direction and has a plate-like shape having parallel and flat front and rear wall surfaces 19a and 19b. The first and second brackets 17 and 19 constitute a lever mounting unit 21, which carries the individual levers 13.

Leaf springs 22 each secured by a set screw to the first bracket 17 of the unit 21 serve as urging means. They each engage at the free end with the other free end of each lever 13 and urge the lever 13 in the counterclockwise direction with respect to the pin 18, thus urging the detection roll 12 toward the transfer roll 10.

The leaf spring 22 as the urging means may be replaced by a coil spring or the like, and also the illustrated engagement position of the lever 13 is by no means limitative.

The second bracket 19 of the unit 21 is formed with a plurality of horizontally spaced-apart engagement holes 23, and the frame 15 has horizontally spaced-apart pins 34 projecting from its front surface 15a. These pins 24 snugly fit in the respective engagement holes 23. The pins 24 and engagement holes 23 constitute a positioning means, which determines the mounting position of the unit 21 with respect to the frame 15. FIG. 2 shows the unit 21 in its state mounted on the frame 15. In this state, the rear surface 19b of the second bracket 19 is in close contact with the front surface 15a of the frame 15.

Designated generally at 25 is a fixing means 25 for holding the unit 21 in the mounting position. It includes an urging member 26 adapted to abut against the front surface 19a of the second bracket 19, vertical support lever 27 supporting at the lower end thereof urging member 26 and horizontal support member 29 horizontally extending from the front surface 15a of the frame 15 and pivotally supporting via a pin 28 a vertical support lever 27. It further includes a short link 30 pivoted at one end by a pin 31 to an intermediate portion of the vertical support lever 27.

As is seen from FIG. 3, the urging members 26, vertical support levers 27, horizontal support members 29 and short links 30 are provided as two sets laterally spaced apart. The short links 30 are connected at their other ends by a rod 32, and a handle lever 33 is linked at an intermediate portion thereof to the middle portion of the rod 32. The handle lever 33 has its stem pivoted by a pin 35 to a support member 34 horizontally extending from the front wall 15a of the frame 15 and is provided at its free end with a spherical knob 36. Further, return springs 37 are each stretched between the frame 15 and each pin 31.

In the state of FIG. 2, the handle lever 33 horizontally overlaps each short link 30, and an axis of the rod 32 is found slightly below the dead line connecting the axis of each pin 31 and the axis of the associated pin 35. In this state, the handle lever 33 and short links 30 hold the unit 21 in its locked state in co-operation with the vertical support levers 27 and urging members 26, with the urging member 26 strongly urging the second bracket 19 of the unit 21 against the front wall 15a of the vertical frame 15.

Figure 4:
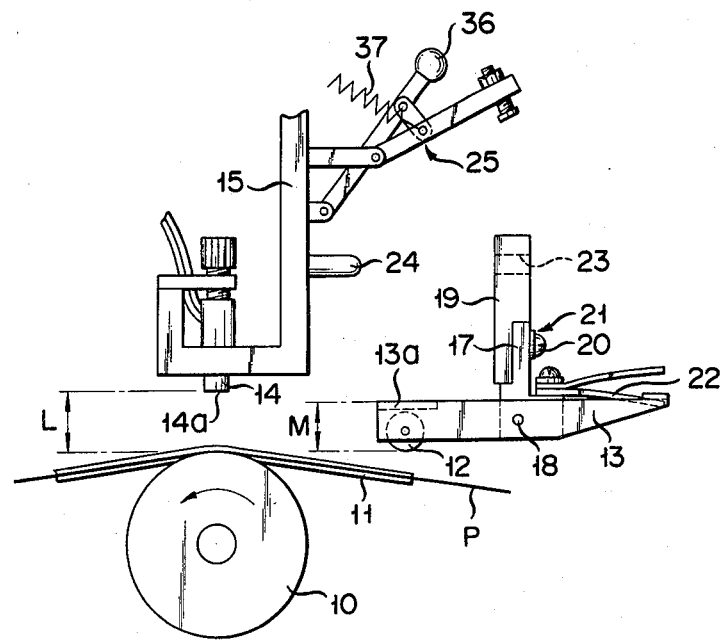
FIG. 4 is an elevational view showing the device of FIG. 2 but with a detection roll in a state taken away together with a lever mounting unit.

When the knob 36 is raised from the state of FIG. 2, the axis of the rod 32 is upwardly moved beyond the dead line connecting the pins 31 and 35, whereby the urging action of the urging member 26 is released. As the handle lever 33 is further turned counterclockwise about the pin 35, each support lever 27 is turned counterclockwise about each pin 28 via each short link 30. When the line along each return spring 37 gets beyond each pin 28, the urging direction of the spring forces is reversed, so that the handle lever 33 can be turned further counterclockwise up to a position as shown in FIG. 4 by the aid of the spring forces.

Figure 2A:
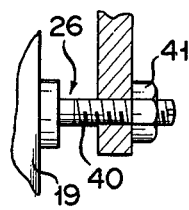
FIG. 2A is a fragmentary enlarged-scale sectional view showing a temporary fixing means used in the device of FIG. 2.

It will be understood that the fixing means 25 in this embodiment consists of a toggle link mechanism including the handle lever 33, short links 30 and support levers 27. Thus, the unit 21 can be locked or clamped in the fixing position with respect to the frame 15 or released from the clamped state by a single action of vertically moving the knob 36. Although the return springs 37 are not essential to the fixing means 25, they also have a toggle spring function and thus have an effect of permitting quicker and swifter locking and releasing operations of the fixing means. The urging member 26, as shown in FIG. 2A, includes a bolt 40 screwed in the support lever 27 and a nut 41, so that it is possible to made fine adjustment of the state of urging the second bracket 19.

When the unit 21 is released, it may be pulled away from the pins 24, whereby the lever 13 and detection roll 12 can be removed together with the unit 21 from the frame 15. In this way, the detection roll 12 can be taken out from the narrow space between the sensor 14 and transfer roll 10. Thus, it is possible to readily and sufficiently clean dust attached to the detection roll 12.

After the cleaning, the positioning and locking of the lever mounting unit 21 can be readily obtained by fitting the unit on the pins 24 and then lowering the knob 36, whereby the detection roll 12 is brought again to its position shown in FIG. 2.

As is shown in FIG. 4, the distance L from the lower end surface 14a of the sensor 14 to the top of the transfer roll 10 and the distance M from the sensing surface 13a of the lever 13 to the bottom of the detection roll 12 are both constant, that is, the magnitude of the electromagnetic gap G is the same before and after the removal of the unit 21.

The first and second brackets 17 and 19 constituting the unit 21 may be constructed as a one-piece member as well.

Figure 5:
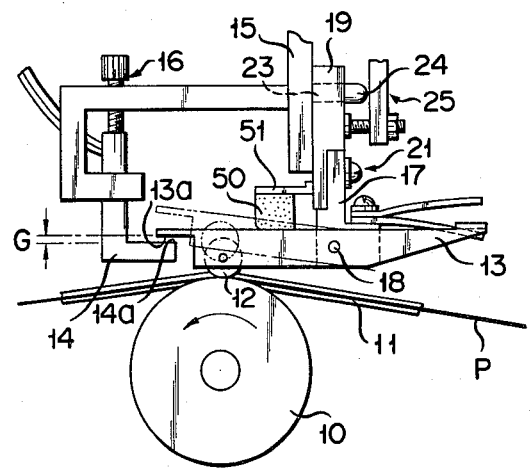
FIG. 5 is an elevational view showing a second embodiment of the paper sheet detection device according to the invention.

FIG. 5 shows a second embodiment of the invention. In the Figure, the parts corresponding to those in the first embodiment of FIG. 1 are designated by like reference numerals, and their detailed description is omitted.

In this embodiment, lever 13 supporting detection roll 12 has an extension extending from the upper edge of its free end portion, in which the detection roll 13 is mounted. A sensing surface 13a is constituted by the lower surface of this extension. A sensor 14 co-operating with this surface and supported by frame 15 has a substantially L-shaped form having a horizontal portion. The upper surface 14a of a free end portion of this horizontal portion faces the sensing surface 13a of the lever 13 and defines therewith the electromagnetic gap G. Unlike the embodiment of FIG. 2, the sensing surface 13a of the lever is located above the co-operating surface of the sensor 14. With this construction, when the lever 13 is turned about a pin 18 to a position as shown by broken lines, with a displacement, i.e., upward displacement, of the detection roll 12 caused due to an increase of the thickness of paper P being transferred underneath the roll 12 by the transfer belt pairs 11, the sensing surface 13a is displaced away from the co-operating surface of the sensor 14, i.e., in the direction to increase the gap G. This increase of the gap is electromagnetically detected, and a detection signal representing the increase of the thickness of paper P is produced from the sensor 14.

Like the embodiment of FIG. 2, the sensor 14 is capable of fine adjustment in the vertical direction with respect to the frame 15 with a screw mechanism 16, and the gap G can thus be adjusted to a desired value.

Like the embodiment of FIG. 2, the lever 13 is pivoted by a pin 18 to a first bracket 17 and is urged in the counterclockwise direction by a leaf spring 22 secured to this bracket.

Further, like the embodiment of FIG. 2, a second plate-like bracket 19, which is secured by set screws 20 to the first bracket 17, is positioned in a predetermined mounting position with respect to the frame 15 by the engagement between positioning pins 24 and engagement holes 23 and is releasably locked in that position by fixing means 25, which has the same construction as that in the embodiment of FIG. 2 but is shown in FIG. 5 only partly. Thus, the lever 13 and detection roll 12 can be removed together with the unit 21 from the frame 15 by releasing the locking action of the fixing means and pulling the second bracket 19 apart from the pins 24.

In this embodiment, a cushioning member 50 is mounted on a mounting member 51 secured to the second bracket 19. The lower surface of the cushioning member 50 is lightly touching the upper surface of the lever 13 as shown in FIG. 5. This cushioning member 50 has a function of quickly damping the vibratory motion of the lever 13. The lever 13 tends to undergo slight vertical vibratory or rocking motion while the detection roll 12 rolls in contact with a paper sheet P being transferred underneath the roll. In the paper sheet thickness detection, it is desired from the standpoint of the accurate detection operation to suppress undesired vibrations to as less extent as possible. The cushioning member 50 has an effect of damping vibrations.

It is possible to provide the cushioning member 50 in the construction of FIG. 2 as well.

FIGS. 6, 7A, 7B and 8 show further modifications of the embodiment of FIG. 2. In these Figures, the corresponding parts to those in FIG. 2 are designated by like reference numerals.

Figure 6:
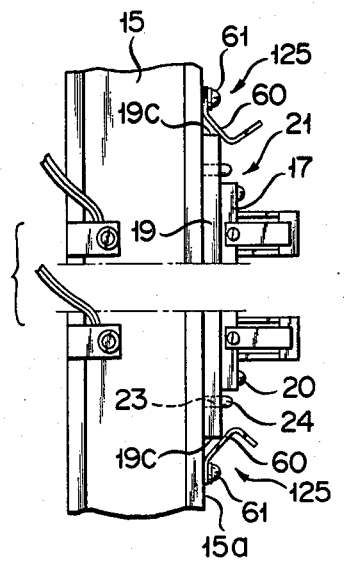
FIG. 6 is a fragmentary top view showing a modification of a temporary fixing means for holding the lever mounting unit in a fixed position relative to a frame.

FIG. 6 is a top view taken in the same direction as FIG. 3, and it shows a modification of the fixing means.

The construction shown in FIG. 6 is the same as the embodiments of FIGS. 2 and 5 insofar as detachable unit 21 is constituted by a first bracket 17 and second bracket 19 secured thereto by screws 20, pivotal levers 13 and leaf springs 22 are mounted on the first bracket 17 and the unit 21 is positioned in a predetermined position by the engagement between engagement holes 23 formed in the first bracket 19 and pins 24 projecting from a frame 15.

In this case, a fixing means generally designated at 125 for releasably holding the second bracket 19 of the unit 21 in position is constituted by a pair of elastic retainer members 60, which have their respective stems secured by screws 61 to a front wall 15a of the frame 15. These retainer members 60 are inclined from their stems toward corresponding edges 19c of the second bracket 19, which is shown in its mounting position, and elastically urge side edge portion of the bracket against the wall 15a of the frame 15. The free end portion of each retainer member 60 is bent or curved as shown in FIG. 6.

Thus, the second bracket 19 of the unit 21 is held elastically clamped by this pair of retainer members 60. The unit 21 can be mounted on the frame 15 and removed therefrom quickly and simply by a snap action, which is obtained by making use of the elasticity of the retainer members 60.

Figure 7A:
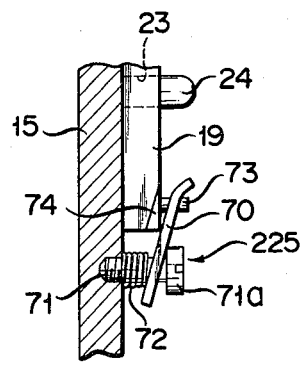
FIG. 7A is a fragmentary sectional view showing a further modification of the temporary fixing means for holding the lever mounting unit in a fixed position relative to a frame.
Figure 7B:
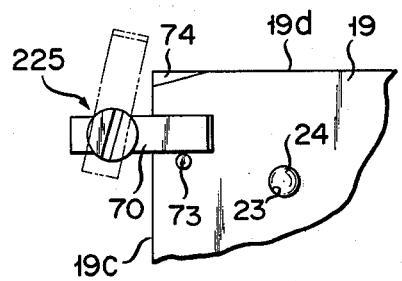
FIG. 7B is a fragmentary right side view of the construction of FIG. 7A.

FIGS. 7A and 7B show a modification of the construction of FIG. 6. In the construction of FIGS. 7A and 7B, a fixing means generally designated at 225 including metal hook members 70 replaces the retainer members 60 as the fixing means 125 shown in FIG. 6. The hook members 70 are disposed near the respective side edges 19c of a second bracket 19 of an unit 21, only one of them being shown in FIGS. 7A and 7B. The illustrated hook member 70 has a free end portion engaging the second bracket 19, which is positioned with respect to a frame 15 by the engagement between pins 24 and holes 23, and a stem portion of the hook member 70 loosely pivoted to a bolt 71 screwed in the frame 15 and having a head 71a. A compression coil spring 72 is provided on the bolt 71 between the stem of the hook member 70 and the frame 15. The spring 72 and bolt head 71a co-operate to cause the hook member 70 to urge the second bracket 19 against the frame 15. The position of the hook member 70 is engagement with the second bracket 19 is regulated by a stop pin 73 projecting from the bracket 19, that is, the hook member 70 in its position shown in FIG. 7B can no further be rotated clockwise about the bolt 71.

The unit 21 can be removed from the frame 15 by manually bringing each hook member 70 from its engagement position shown by solid lines in FIG. 7B to its clear position shown by broken lines.

Each corner of the second bracket 19 defined by each side edge 19c and the upper edge 19d is provided with a chamfer 74. This chamfer provides a cam action to permit the hook member 70 to be smoothly brought into and out of engagement with the second bracket 19 to be obtained.

Figure 8:
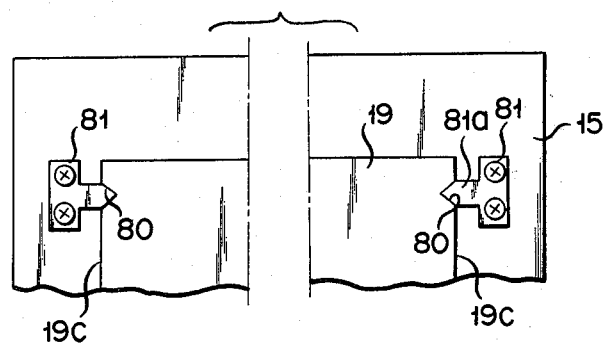
FIG. 8 is a fragmentary view showing a different modification of a positioning means for positioning the lever mounting unit with respect to the frame.

FIG. 8 shows a modification of the aforementioned positioning means consisting of pins and engagement holes. Here, a second bracket 19 of an unit 21 is formed with triangular notches 80 at the opposite side edges 19c. Also, engaging members 81 in the form of a block are secured by screws to a frame 15. The engaging members 81 have respective triangular projections 81a, which snugly fit in the corresponding notches 80 formed in the second bracket 19. By the engagement between the projections 81a and notches 80 the second bracket 19 is positioned in a predetermined position with respect to the frame 15.

The second bracket 19 can be readily removed from the frame 15 by merely pulling the bracket in a direction normal to the plane of FIG. 8, i.e., toward the reader.

The notches 80 and projections 81a need not be triangular in shape; various other shapes are conceivable.

What is claimed is:

1. In a paper transfer system for transferring a paper sheet such as bank note, in which the paper sheet is transferred round a rotary transfer roll mounted in a frame and by band-like transfer belts provided as a plurality of pairs spaced apart laterally with respect to the direction of transfer of said paper sheet, said paper sheet being sandwiched in its transfer between upper and lower belts in each of said belt pairs, a device for detecting the thickness of the paper sheet comprising:

a sensor supported by said frame;

a thickness detection roll disposed to face said transfer roll and pivotally movable according to changes of the thickness of paper sheet being transferred between the detection roll and said transfer roll;

a detection roll supporting lever rotatably supporting said detection roll, said lever having a sensing surface provided near and facing said sensor and defining therewith a variable gap;

a lever mounting unit carrying said lever pivotally mounted therein;

urging means mounted in said lever mounting unit and urging said lever toward said transfer roll;

positioning means for positioning said lever mounting unit in a predetermined mounting position with respect to frame; and fixing means provided on said frame such as to releasably lock said lever mounting unit in said predetermined mounting position including an urging member for urging said lever mounting unit against said frame, a toggle link mechanism coupled to said urging member and a manually operable member coupled to said toggle link mechanism.

2. A device for detecting the thickness of a paper sheet according to claim 1, wherein said toggle link mechanism has a supporting lever supporting said urging member, said urging member being adjustable in position with respect to said support lever for adjusting the working position of said urging member.

3. A device for detecting the thickness of a paper sheet according to claim 1, wherein said sensing surface of said lever is in such a positional relation to said sensor that said sensing surface is displaced away from said sensor when said lever is pivotally moved against said urging means with a displacement of said detection roll caused by an increase of the thickness of paper sheet.

4. A device for detecting the thickness of a paper sheet according to claim 1, which further comprises a damping member in contact with said supporting lever for damping vibratory motion thereof.

5. A device for detecting the thickness of paper sheet according to claim 5, wherein said damping member is secured to said lever mounting unit.

6. In a paper sheet transfer system for transferring a paper sheet such as bank note, in which the paper sheet is transferred round a rotary transfer roll mounted in a frame and by band-like transfer belts provided as a plurality of pairs spaced apart laterally with respect to the direction of transfer of said paper sheet, said paper sheet being sandwiched in its transfer between upper and lower belts in each of said belt pairs, a device for detecting the thickness of the paper sheet comprising:

a sensor supported by said frame;

a thickness detection roll disposed to face said transfer roll and pivotally movable according to changes of the thickness of paper sheet being transferred between the detection roll and said transfer roll;

a detection roll supporting lever rotatably supporting said detection roll, said lever having a sensing surface provided near and facing said sensor and defining therewith a variable gap;

a lever mounting unit carrying said lever pivotally mounted therein including a plate-like bracket adapted to abut against a frame wall and having a hole formed therein;

urging means mounted in said lever mounting unit and urging said lever toward said transfer roll;

positioning means for positioning said lever mounting unit in a predetermined mounting position with respect to frame including a pin projecting from said frame wall for passage through said hole; and fixing means provided on said frame such as to releasably lock said lever mounting unit in said predetermined mounting position.

7. A device for detecting the thickness of a paper sheet according to claim 6, wherein said locking means includes at least one pair of elastically deformable retainer members respectively having stem portions secured to said frame wall and free end portions corresponding to the opposite side edges of said bracket, said opposite side edges of said bracket being adapted to be elastically hooked by said retainer members.

8. A device for detecting the thickness of a paper sheet according to claim 6, wherein said locking means includes at least one pair of retaining units disposed to correspond respectively to the opposite side edges of said bracket and each having a bolt screwed in said frame wall, a hook member having a stem portion rotatably supported by said bolt and a compression coil spring provided on said bolt between said frame wall and said stem portion of said hook member, said hook member being adapted to engage the corresponding side edge of said bracket.

9. A device for detecting the thickness of a paper sheet according to claim 8, wherein said bracket has chamfered corners corresponding to said respective hook members.

10. A device for detecting the thickness of a paper sheet according to claim 9, wherein each of said retaining units further has a stop pin projecting from said bracket and adapted to engage said hook member and prevent rotation of said hook member from a regular operating position thereof in engagement with said bracket in a direction opposite to the direction of disengaging said hook member from said bracket.

11. In a paper sheet transfer system for transferring a paper sheet such as bank note, in which the paper sheet is transferred round a rotary transfer roll mounted in a frame and by band-like transfer belts provided as a plurality of pairs spaced apart laterally with respect to the direction of transfer of said paper sheet, said paper sheet being sandwiched in its transfer between upper and lower belts in each of said belt pairs, a device for detecting the thickness of the paper sheet comprising:

a sensor supported by said frame;

a thickness detection roll disposed to face said transfer roll and pivotally movable according to changes of the thickness of paper sheet being transferred between the detection roll and said transfer roll;

a detection roll supporting lever rotatably supporting said detection roll, said lever having a sensing surface provided near and facing said sensor and defining therewith a variable gap;

a lever mounting unit carrying said lever pivotally mounted therein including a plate-like bracket adapted to abut against a wall of said frame in a predetermined mounting position and having notches formed therein at opposite side edges thereof;

urging means mounted in said lever mounting unit and urging said lever toward said transfer roll;

positioning means for positioning said lever mounting unit in a predetermined mounting position with respect to frame including engaging members secured to said frame wall at positions corresponding to said notches formed in said bracket, each said engaging member having a projection of a shape for snugly fitting in one said notch; and fixing means provided on said frame such as to releasably lock said lever mounting unit in said predetermined mounting position.

* * * * *